June 9, 1964 J. LUND Re. 25,594

TORQUE LIMITING SPRAG MECHANISM

Original Filed June 17, 1960 3 Sheets-Sheet 1

INVENTOR.

JOHAN LUND

BY Whittemore, Hulbert & Belknap

ATTORNEYS

TORQUE LIMITING SPRAG MECHANISM

Original Filed June 17, 1960 3 Sheets-Sheet 2

INVENTOR.

JOHAN LUND

BY Whittemore, Hulbert & Belknap

ATTORNEYS

TORQUE LIMITING SPRAG MECHANISM

Original Filed June 17, 1960 3 Sheets-Sheet 3

INVENTOR.
JOHAN LUND
BY Whittemore Hulbert & Belknap
ATTORNEYS

United States Patent Office

Re. 25,594
Reissued June 9, 1964

25,594

TORQUE LIMITING SPRAG MECHANISM

Johan Lund, Detroit, Mich., assignor to Formsprag Company, Warren, Mich., a corporation of Michigan Original No. 3,094,195, dated June 18, 1963, Ser. No. 36,961, June 17, 1960. Application for reissue Jan. 6, 1964, Ser. No. 344,800
29 Claims. (Cl. 188—82.2)

Matter enclosed in heavy brackets [ ] appears in the original patent but forms no part of this reissue specification; matter printed in italics indicates the additions made by reissue.

The present invention relates to an improved torque limiting mechanism incorporating a sprag clutch type device and, more particularly, to a torque limiting sprag mechanism by which input torque in either rotative direction transmitted, preferably directly to an output member, may be reliably limited, so as to prevent the arising of damaging or destructive stress in any part of the mechanism.

It is an object of the invention to provide a mechanism of this sort which contains a sprag clutch type locking device characterized by one or more sets of sprag elements, there being in the illustrated embodiment a pair of sprags in each set, with the respective sprags of the set oriented oppositely of one another whereby, depending upon the direction of rotation of an inner input member upon which the sprags are carried, one of the same may be shifted, in response to the arising of a torque in the mechanism exceeding a predetermined value, into locking engagement with a fixed race, thereby preventing the building up of any further torsional stress in the mechanism.

Another object is to provide a sprag type torque limiting mechanism, as described, in which all sprags of the several sprag sets are normally urged resiliently in a direction to place and maintain the same out of the aforesaid locking and torque limiting engagement with a fixed race, being displaced from that position by control fingers which come into action when a predetermined torsional stress is exceeded.

Yet another object is to provide a sprag mechanism of the class described, characterized by sprags shifted by control elements or fingers into locking engagement with a fixed race, upon the building up of a predetermined torsional stress in the line of power transmission from input to output, in which the sprags and fingers are nevertheless rotatable freely in either direction relative to a concentric outer fixed locking race, with radial clearance relative to the later, under any degree of torsional loading less than said predetermined value. Instantaneous setting and resetting in either rotative direction are thus possible.

Above the predetermined value referred to a relative rotative shift of the control members or fingers and the sprags causes the later to be tilted into a wedging and locking engagement with the outer locking member or race as an anchor, thus to prevent further torsional stress within the mechanism, or the line of torque transmission from input to output.

Another general object is to provide a sprag torque limiting mechanism operating as described, which is of extremely simple and rugged structural character, and is capable of operating efficiently under extremely severe conditions, such as of vibration and the like.

A still further object is to provide a sprag type torque limiting mechanism operating in accordance with the foregoing principles, in which special provision is made to control or discipline possible high frequency vibratory action or chatter in operation, as in the event the mechanism is employed in the adjustable control of a device, such as an airplane elevator flap or the like, subject to considerable vibration in normal use.

In accordance with one embodiment having this objective, the invention contemplates the stabilization of the sprags by the use of individual control fingers separating the sprags which constitute an oppositely oriented pair, in addition to control fingers separating successive oppositely oriented pairs, as in the broader aspect of the invention. This assures a complete bi-directional control and disciplining of the sprags by the fingers against vibratory chatter in operation.

In accordance with an alternative embodiment having the objective of eliminating possible vibratory sprag action, the invention contemplates the use of an additional freely floating control ring having spacer bars projecting axially into the spaces, not only between successive oppositely oriented sprag pairs (as the control fingers proper of the member project), but also into the spaces between individually oppositely oriented sprags constituting such pairs. The result is that the freely floating ring serves as an agency by which the sprags are at all times engaged to stabilize and discipline the same against high frequency vibratory chatter. In this connection, the bars in question are employed, when one sprag of a pair is in an engaged, locking position, to urge the other sprag of the pair against the action of the spring which holds it in a normal disengaged position, to an even more fully disengaged position, in which the spring exerts augmented force to hold such disengaged sprag against the vibratory chatter.

It is evident that, in consequence of the improved means for controlling the disengaged sprags against vibratory action, insurance is had that all such sprags will be positively held in a position to re-engage and lock the mechanism when the torsional stress on its torque rod is such as to so demand.

The foregoing as well as other objects will become more apparent as this description proceeds, especially when considered in connection with the accompanying drawings illustrating the invention, wherein.

Figure 4:
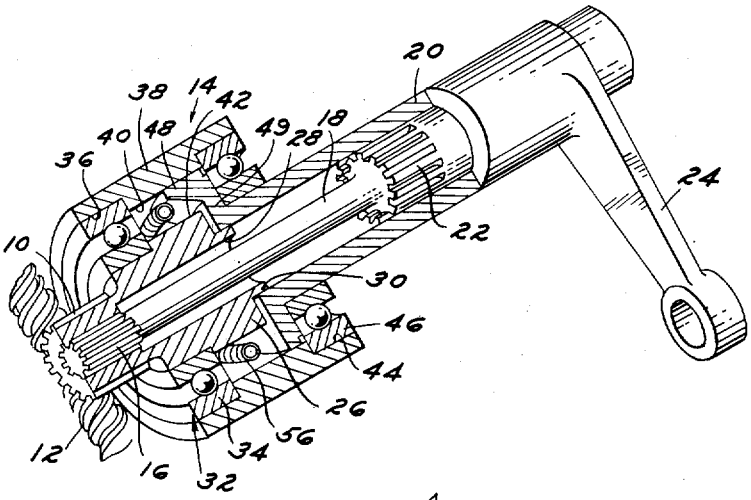
FIG. 4 is a somewhat schematic perspective view, partially broken away and in axial section, showing a typical application of the principle of the invention to a positioning device.

First referring to FIG. 4 of the drawings showing an application of the subject mechanism to a positioning device as being illustrative of many different applications to which the invention is suited, the reference numeral 10 lesignates a worm gear or pinion which may be assumed o be rotatably actuated through meshing engagement with he worm 12. This type of irreversible drive unit, or its quivalent, is to be preferred for certain uses of the orque limiting mechanism of the invention, generally esignated 14; however, other uses do not impose such reuirement or even desirability. Hence it is to be undertood that the member 10 may be otherwise actuated, diectly or through appropriate means drivingly connected ıereto in the manner of the worm 12, for example.

As shown in FIG. 4, the worm gear or pinion 10 has a xed spline driving connection at 16 to one end of an longated torque rod 18 coaxial therewith; and the torque od 18 is also drivingly connected to a tubular output ıember 20. A spline connection 22 is appropriate for ıe purpose.

The tubular output member or sleeve 20 is shown in IG. 4 as carrying an integral operating arm or crank 4, the function of which may be assumed to be that of ositioning a part, such as an airplane aileron, elevator r stabilizer, in response to rotative manipulation of the orm pinion 10 or equivalent member, yet without imosing any excess of a predetermined torque on the parts ı its operation.

In order to attain this objective, the member 10 is shown s fixedly connected rigidly, preferably integrally, to an ıner annular race 26 of the torque limiting mechanism 4, the nature of which is hereinafter described in greater etail. Torsion rod 18 extends coaxially through the ıner bore 28 of race 26, and the latter has a reduced iameter, cylindrical shoulder 30 which pilots within the ore of tubular member or sleeve 20.

The race 26 is journaled between the pilot shoulder 30 nd its splined connection to member 10, as by means of ball bearing 32, the outer race 34 of which is fixed ithin an internal annular recess 36 at one axial end of n outer race 38. This outer race is a fixed one presentıg an internal cylindrical race surface 40 adapted to be ngaged by the sprags of the mechanism 14, in a manner ı be described; and these sprags are carried, in a manner lso to be described, on an outer surface 42 of the inner ıce 26.

In order to complete the anti-friction bearing provisions f the installation, the tubular member of sleeve 20 is ournalled within an annular recess 44 of fixed race 38, as y a further ball bearing 46, whose inner race surrounds ıe sleeve.

Figure 1:
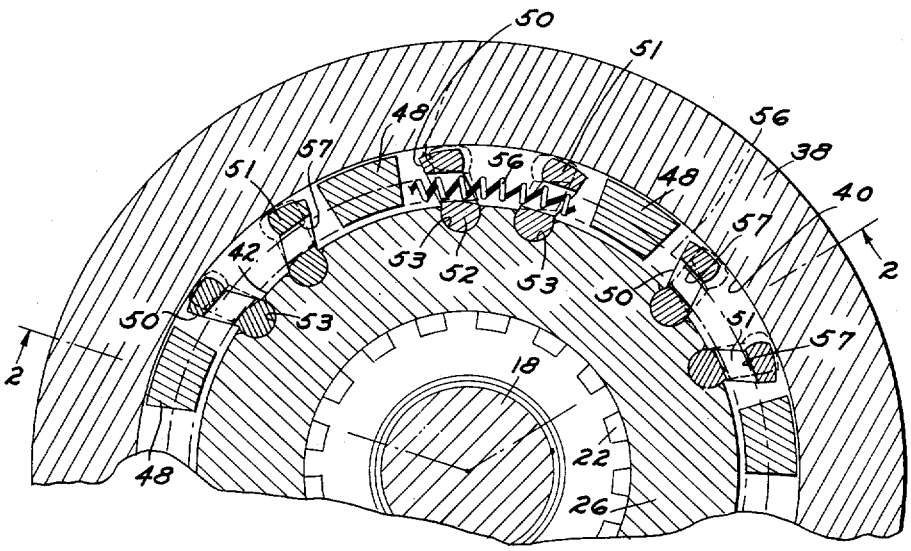
FIG. 1 is a fragmentary view in transverse section, along a line corresponding to line 1—1 of FIG. 2, of a torque limiting mechanism in accordance with one embodiment of the invention.
Figure 2:
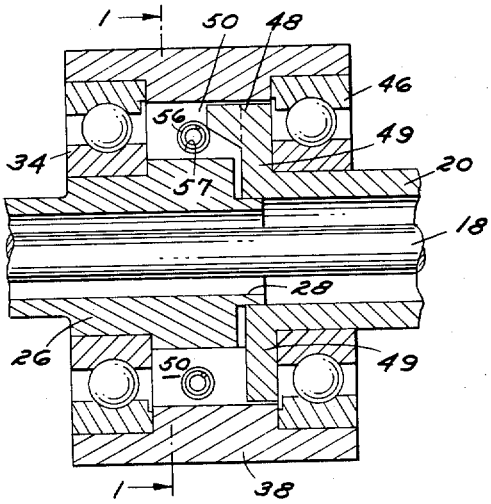
FIG. 2 is a fragmentary view in section along broken line 2—2 of FIG. 1.
Figure 3:
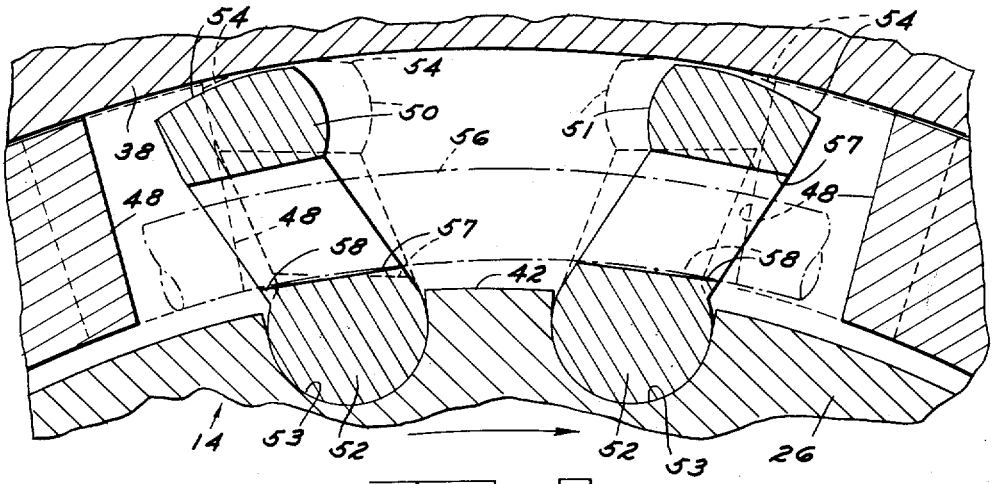
FIG. 3 is a fragmentary, enlarged scale view similar to FIG. 1, more clearly depicting the operation of the mechanism.

Now referring to FIGS. 1, 2 and 3 in conjunction with IG. 4, the tubular member or sleeve 20 is integrally ormed, or otherwise constituted, to provide a plurality of qually spaced control fingers 48 extending axially inward- of the anti-friction bearing 46 for the sleeve, the sleeve ı this end carrying a radially outwardly extending flange 9 upon which the fingers 48 are formed to extend into ıe annular space between bearings 32, 46 and races 26, 8. As shown in FIGS. 1 and 3, the fingers are of trunıted, generally triangular section; and they and the flange 9 which carries the same are externally arcuate in a ıdius slightly less than that of the outer fixed race surıce 40, for a free running clearance in the outer race.

The control fingers 48 extend axially inwardly, as shown ı FIG. 1, between successive circumferentially spaced ts or pairs of sprags 50, 51, these sprags each having an ıner end 52 of generally semi-cylindrical cross sectional ıtline socketed in a recess or seat 53 of similar outline ı the inner race 26, there being sufficient clearance at ıe outer periphery 42 of this race to permit free pivoting the sprag in the socket seat 53.

The sprags 50, 51 are of like cross sectional outline, ıt are oriented in each pair or set oppositely of one ıother, as best shown in FIG. 3. Thus, each sprag has ı outer wedging surface 54 of a known contour adapted ı engage and wedge against the outer sprag race surface 0 and thus lock the inner race against further rotation;

however, the surface 54 of the sprag 50 is so engaged by a clockwise movement about its socket pivot, while the sprag 51 is thus engaged by a counterclockwise movement, in each case from the solid line to the dotted line position appearing in FIG. 3.

The sprags of each pair are urged to the solid line position, withdrawn from engagement with the fixed outer race 40, in any suitable means, and typically by an annular coiled garter spring 56 extending through central apertures in the sprags and engaging edges 58 of such apertures in a manner to exert the desired tilting force, i.e., counterclockwise as to sprag 50 and clockwise as to sprag 51. Provisions of this sort are known to the art, and it will be appreciated that the single garter spring 56 has its equivalent in dual garter springs acting at opposite axial end sprag recesses, and the like.

The significant feature is that such spring means normally urges the sprags of the respective sets simultaneously out of position for wedging engagement with the fixed race, rather than into such position. As illustrated in FIG. 3, when the sprags 50, 51 are in their solid line position the spring 56 will lie over the radially inner surface of sprag opening 57 in such manner as to exert no further effort on the sprag to further tilt it in this direction, i.e., to hold the sprag in its normal solid line position and circumferential spacing relative to an adjacent finger 48, as will be described.

In the normal position of the sprags 50, 51 and the fingers 48 on either circumferential side of a sprag pair, in which position the sprags and fingers normally rotate as the control or operating member 24 is rotated, the circumferential spacing of either sprag 50 or 51 from a finger 48 at one side thereof is quite slight. Thus it is contemplated that a relative motion in either direction of, say, 5½°, depending upon the direction of motion, will result in a sprag 50 or 51 being in engagement with an adjacent finger. Such engagement is the consequence of a build-up of torque in torsion rod 18 and connected parts in excess of a predetermined value, and has the attendant result to be described. However, this relative spacing is subject to change, in accordance with the desired torque limiting characteristic intended for any given use.

In operation, let it be assumed that a manual or other force is applied to operating worm 12 with the intent of predeterminedly rotating worm pinion 10 and, through torsion rod 18 and spline connections 16 and 22, of rotating the control or positioning arm or crank 24 fixed to sleeve 20. Inner race 26 rotates with worm pinion 10 as a part thereof, carrying the sets of retracted sprags 50, 51 therewith, and normally the torsion rod 18 similarly rotates the sleeve 20 and arm or crank 24, whereby the latter locates or positions as desired a further part (not shown) connected thereto.

However, if undue resistance to the last named motion is presented, the torsion rod 18 will yield angularly, with the result that the inner race 26 will rotate slightly relative to the control fingers 48 on sleeve 20, as the latter is subjected to the mounting load through arm or crank 24. If the resistance to motion of the latter continues (assuming that the direction of torque on inner race 26 is in the direction indicated by the arrow in FIG. 3), the sprag 51 will be brought into engagement with the finger 48 to its right, after an extremely small clearance travel referred to above, in a relationship of the sprag and finger suggested in dotted line in FIG. 3 (although it is to be understood that it is the sprag, rather than the finger, which in this instance partakes of the motion, as appears to be the case in that figure). Obviously, when the direction of torque on inner race 26 is the opposite, it will be the other sprag 50 which is brought into engagement to the left with an adjacent finger 48.

The consequence in either case is that the sprag 50 or 51 is tilted from its solid to its dotted line position of FIGS. 1 and 3, bringing its wedging surface 54 into wedging engagement with the fixed race surface 40. After this, the sprag acts as a rigid post or column locking inner race 26 against further angular motion, and thus preventing the build-up of further torque in torsion rod 18, sleeve 20, operating arm 24 and in other torque sustaining parts connected to the latter. Immediately the torque load is diminished, the sprag 50 or 51 recedes from engagement with the adjacent finger 48, and the spring 56 instantaneously returns the sprag (counterclockwise as to sprag 50 and clockwise as to sprag 51) to its retracted solid line position out of engagement with the fixed locking race 38.

It may be seen from the above that the mechanism 14 will also limit undesired feed back of torque through the same, for example, onto the irreversible operating worm 12. The only difference is that, when the predetermined minimum torque value arises, torsion rod 18 will twist in the angular direction opposite that involved in the above described operation, the fingers 48 will move the slight clearance space to bring them into engagement with the adjacent sprag 50 or 51, and the latter will be tilted (clockwise as to sprag 50 and counterclockwise as to sprag 51) to the dotted line wedging and locking position shown in FIG. 3. Thereafter, no further torsion is imposed on rod 18, nor torque transmitted to or through worm pinion 10 or its equivalent; and the wedged sprag acts as a rigid post or column sustaining further thrust in torque.

While the illustrated embodiment of the invention, featuring an internal, rotatively adjustable sprag socketing race 26 and a fixed outer wedging and locking race 38, is a very efficient and compact one, it is to be understood that in these respects the mechanism of the invention may be reversed, employing suitable provisions including a torque rod coupled to a rotatively adjustable outer race and locked in the event of excessive torque against a fixed inner race. Furthermore, the torque rod 18 may find its equivalent in a flat leaf spring or in a torsion spring, depending on load limiting specifications.

It is seen that the torque limiting mechanism of the invention is very simple, rugged and inexpensive as to its parts. As indicated above, the degree of rotation necessary to lock the sprags is slight, and in this respect the mechanism may be easily engineered to present any desired torque limiting characteristic.

In any design, it is to be understood that under torsion stress on the torque rod 18, or equivalent device, which is less than the predetermined allowable maximum, the control fingers 48 and sprags 50, 51 are carried by the inner race 26 freely and with radial clearance relative to the outer locking race, with the sprags urged by spring 56 to the position shown in solid line in FIGS. 1 and 3, so that instantaneous setting and resetting of arm 24 under a torsional stress less than the designed maximum are possible.

Certain installations of the torque limiting control of the invention subject the same to extreme or high frequency vibration in use, an example being an installation controlling the bi-directional, torsionally limited setting of an airplane wing flap. In order to have positive assurance that all sprags of the respective reversely oriented sets or pairs of the mechanism shall take simultaneous locking engagement with the fixed race, from which they are normally spaced radially in the usual setting and resetting manipulations of the mechanism, the invention contemplates alternatives having augmented vibration inhibiting and disciplining means such as are shown in the embodiments of FIG. 5 and of FIGS. 6–8, respectively.

In these adaptations, a representation of the garter spring corresponding to the annular spring 56 has been omitted for added simplicity; however, it is to be understood that the spring or equivalent means has the identical function of normally maintaining the locking sprags disengaged from and in radially spaced relation to the locking race. Indeed, the embodiments of FIGS. 5 through 8 ir corporate features having an action whereby the spring action is availed of in augmented degree for the vibratic or chatter inhibiting or disciplining effect.

Figure 5:
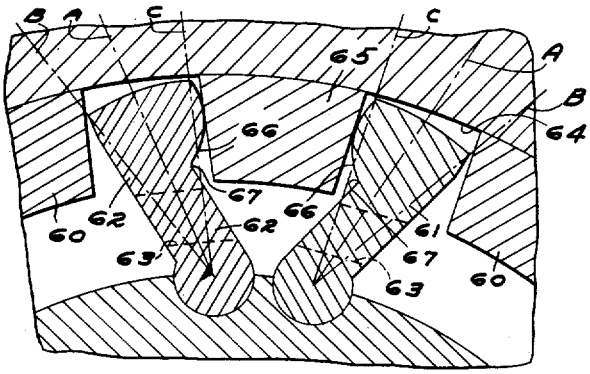
FIG. 5 is a fragmentary view in section similar to FIG. 3, illustrating components of a torque limiting mechanism operating in the manner of the embodiment of FIGS. 1–4, but additionally equipped to control its sprags against excessive vibratory action, hence to positively insure their simultaneous locking engagement when desired.

As illustrated in FIG. 5, the assembly is generally sim lar to that of the first embodiment, including the provisio of control members or fingers 60 carried by a memb (not shown) corresponding to the flange 49 of the tubul output member 20, and extending axially between succe sive sets or pairs of reversely oriented sprags, each suc set comprising two sprags 61, 62 normally urged in opp site circumferential directions by a garter spring (n shown) disposed in recesses or apertures 63 formed in th respective sprags.

It will be noted in FIG. 5 that the circumferential clea ance between successive control fingers 60 and the respe tive sprags 61, 62 is less than as appears in FIGS. 1 and However, it is to be understood that the embodiment FIG. 5, like the embodiment of FIGS. 1–4, is reliant upo the use of a torque rod (not shown) corresponding to th torque rod 18 rotatively locked at one end to the tubul member 20 and at the other end to the rotative sprag ra 26; and that the locking action of the embodiment of FI 5 follows a predetermined stressing of such torque ro sufficient to enable the fingers, moving in one rotative d rection or the other, to shift the respective sprags 61, 6 against the outer locking race, here designated 64.

For the purpose of affording augmented anti-vibratio control, the embodiment of FIG. 5 employs an auxiliar set of control fingers or bars 65 on the member carryin the same and the fingers 60, these auxiliary members a ternating with the control fingers 60 and being positione equidistant between the same to extend axially betwee the sprags 61, 62 of each oppositely oriented pair, wit slight circumferential clearance relative to the rounde sprag surface 66 facing the auxiliary control members 6 Thus, upon building up of excessive torque in the torsio member corresponding to the torque rod 18, in either ar gular sense, one of the sprags 61, 62 will be engaged by primary control finger 60, and will be shifted angularl from a normal neutral disengaged position in respect t the locking race 64, represented for example by a dot-das line "A" running from the axis of tilting movement of th sprag through its wedging point, to a wedging position co responding to the dot-dash line "C." In so shifting, th sprag 61 or 62 in question will, through the auxiliary cor trol member or finger 65, shift the other sprag of the pa from the normal neutral position "A" to an extreme wit drawn or release position corresponding to the dot-das line "B." It will be noted that in order to accommodat this extreme shift, the shape of the sprags 61, 62 is mod fied somewhat, by comparison with those of the first em bodiment, in that inwardly of the curved surface 66 therec they are recessed circumferentially more deeply at 67, s as to receive the adjacent edge of the respective auxiliar control fingers or members 65.

Thus the released sprag is held against the member c finger 65 under an augmented spring bias due to its bein shifted to the extreme position "C." As so held, objec tionable vibratory action or chatter is impossible, and it i insured that, when the excessive torsional stress is re moved, all released sprags will simultaneously return t neutral position. By the same token, all correspondin sprags will be simultaneously and uniformly engaged t lock the mechanism when an excessive torque arises, i either direction.

Figure 6:
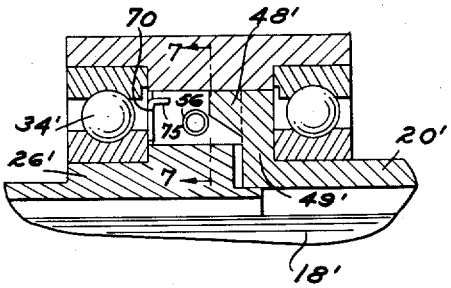
FIG. 6 is a fragmentary view in section similar to FIG. 2, showing a further anti-friction embodiment featuring augmented control through the agency of a special floating washer or ring carrying control bars.
Figure 7:
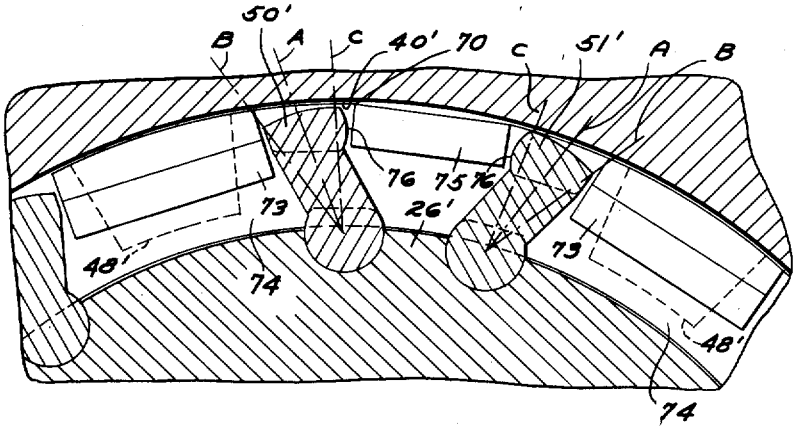
FIG. 7 is a fragmentary enlarged scale view in transverse section along a line corresponding to line 7—7 of FIG. 6.
Figure 8:
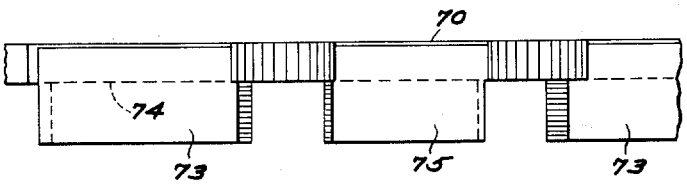
FIG. 8 is a fragmentary elevational view further illustrating the bar-carrying control ring or washer appearing in FIGS. 6 and 7.

The embodiment of the invention illustrated in FIG 6, 7 and 8 utilizes components which are in essence iden tical to those of the embodiment of FIGS. 1 through 4 hence for simplicity corresponding components will b designated by corresponding reference numerals, primec and extended description will be dispensed with.

Thus, as compared with FIGS. 2 and 4 of the drawing there is a tubular output member 20' having an annula ge 49′ carrying the primary, axially extending control ıbers or fingers 48′, which, as in the first embodiment, nd between the axially spaced pairs or sets of sprags 51′ carried by a bi-directionally rotative inner race and engageable with a fixed outer race 40′; and the ıue limiting action of these components is exactly as ribed in connection with FIGS. 1 through 4.

However, in order to contain and discipline vibratory on of the sprags 50′, 51′, and thus insure uniform and ıltaneous locking engagement and disengagement eof in unitary sets, the embodiment of FIGS. 6–8 em- 's a special auxiliary annular washer or ring 70.

ı the form illustrated in FIGS. 6, 7 and 8, the control her or ring 70 is shown as a sheet metal stamping; ough it will be appreciated by those skilled in the art the ring may be a machined piece. As embodied in amping, ring 70 floats in the annular space between bi-directional inner race 26 and the fixed locking race moving angularly essentially only in response to en- ement by certain sprags 50′, 51′, and responding to ı engagement to move the other of the respective ıgs.

'o these ends, the control ring 70 is formed to provide ries of axially extending bars 73 of substantial cir- ıferential extent, which are slit and offset from the ular flat, radially extending ring body 74. These bars are spaced equidistant from one another about the 70, and successive bars 73 are spaced by secondary 75 equidistant therebetween. Secondary bars 75 are ck from the radial body 74 of the ring at a radial ance from the axis thereof to position them for en- ement with the rounded heel surface 76 of the respec- sprags 50′, 51′. Similarly, the bars 73 are engage- with an opposite, axially extending surface of each ıg at a radially more inward point.

'he sprags 50′, 51′ are socketed in the inner race as ribed in connection with FIG. 1; and as indicated ve, they are actuated for locking engagement with d race 40′ to anchor against further torsional stress on parts in the same way. Thus, for the purpose of the ıaining description of the embodiment of FIGS. 6, 7 8, the primary sprag control fingers 48′ may be con- red without reference to the primary torque limiting ion thereof, and this factor may also be dismissed in rence to the function of the respective primary and ondary anti-vibration control bars 73 and 75.

ssuming that torque is applied to the inner race 26′ ause the sprags 51′ to contact the control members or ers 48′ connected by tubular member 20′ to the torque (not shown), this will cause the fingers 48′ (assum- the movement is counterclockwise in FIG. 7) to move sprags 51′ against the respective control bars 75, ch will in turn shift to engage the respective other ıgs 50′. In this operation, the control fingers 48′ ve the sprags 51′ toward locking engagement with fixed 40′; and the other sprags 50′ are moved further ıy from their neutral disengaged position shown in d line in FIG. 7. So positioned, the control finger is actually working against two sprags, through the ncy of bar 75, and is therefore, opposed by twice the mal energizing force of the garter spring. This tends discipline and limit vibration action of the sprags en it is important that all thereof engage the outer e 40′ at the same time.

Any further movement of the basic control fingers 48′ l cause all of the sprags 51′ to engage and lockingly lge or anchor against race 40′, and will also move the er, oppositely oriented sprags 50′ of each pair still ther away from the outer race, augmenting the anti- ıtter confinement of the latter. In the reverse direction setting movement of inner race 26′, the reverse action es place, as regards the respective sprags 50′ and 51′.

FIG. 7, just as in FIG. 5, the characters "A," "C" and ' indicate positions of a theoretical line through the s of tilt of the sprags upon inner race 26′ and the point of sprag wedging engagement in, respectively, the normal and neutral retracted position of the sprag from outer race 40′, its position of wedged engagement with that race, and its extreme released position.

It is seen that the arrangement of FIGS. 6, 7 and 8 provides an alternative to that of FIG. 5, by which the sprags, entirely free-moving in the normal unstressed condition of the mechanism, are at all times positively maintained in proper location to simultaneously take locking engagement with the outer race, and, as regards the non-engaged sprags, to prevent objectionable high frequency vibration thereof. Clearances between the respective bars 73, 75 of auxiliary control washer or ring 70 are such as to allow the sprags 50′, 51′ to operate freely in any direction or position of normal adjustment of the machanism. Ring 70 is then controlled by the sprag movement, and the established relationship is always maintained between it, the sprags, and the basic control fingers 48′.

In accordance with the invention, it is important to have some degree of lost motion in the action of the various control fingers for the sprags, permitting, say, 6½° of arcuate travel between the start of movement thereof and the final locking engagement of the sprags with the outer locking race. In some instances, normal manufacturing clearances will permit adequate lost motion. In any instance, the torque rod 18 or 18′ may be designed to afford the desired free movement.

What I claim as my invention is:

1. A torque transmitting and limiting mechanism, comprising a pair of coaxial, axially telescoped race members, one of which is rotatively fixed and the other of which has at least limited rotatability about the axis of said members, and means operatively connected to the last named member to so rotate the same only under torque applied thereto not exceeding a predetermined value, said last named means comprising a first power member having a rotatively fixed drive connection to said rotative race member, a second power member having means including a flexible torsion element drivingly connecting the same to said first power member, said first and second power members being rotatable as a unit up to a predetermined value of torque stressing of said torsion element, and means engaging between said race members to lock said power members against rotation under a torque stress on said element in excess of said predetermined value.

2. A torque transmitting and limiting mechanism, comprising a pair of coaxial, axially telescoped race members, one of which is rotatively fixed and the other of which has at least limited rotatability about the axis of said members, and means operatively connected to the last named member to so rotate the same only under torque applied thereto not exceeding a predetermined value, said last named means comprising a first power member having a rotatively fixed drive connection to said rotative race member, a second power member having means including a flexible torsion element drivingly connecting the same to said first power member, said first and second power members being rotatable as a unit up to a predetermined value of torque stressing of said torsion element, means predeterminedly rotating with said second power member and torsion element upon torque flexure of the latter, and means controlled by said predeterminedly rotating means to engage between said race members to lock said power members against rotation under a torque stress on said element in excess of said predetermined value.

3. A bi-directional torque transmitting and limiting mechanism, comprising a pair of coaxial, axially telescoped race members, one of which is rotatively fixed and the other of which has at least limited rotatability about the axis of said members, and means operatively connected to the last named member to so rotate the same in either angular direction only under torque applied thereto not exceeding a predetermined value, said last named means comprising a first power member having a rotatively fixed drive connection to said rotative race member, a second power member having means including a flexible torsion element drivingly connecting the same to said first power member, said first and second power members being rotatable bi-directionally by said first power member as a unit up to a predetermined value of torque stressing of said torsion element, and means engaging between said race members to lock said power members against rotation under a torque stress on said element in excess of said predetermined value.

4. A torque transmittting and limiting mechanism, comprising a pair of coaxial, axially telescoped race members, one of which is rotatively fixed and the other of which has at least limited rotatability about the axis of said members, and means operatively connected at the last named member to so rotate the same only under torque applied thereto not exceeding a predetermined value, said last named means comprising a first power member having a rotatively fixed drive connection to said rotative race member, a second power member having means including a flexible torsion element drivingly connecting the same to said first power member, said second power member being rotatable by and with said first power member substantially as a unit up to a predetermined value of torque stressing of said torsion element, means predeterminedly rotating with said second power member and torsion element upon torque flexure of the latter, and means controlled by said predeterminedly rotating means to engage between said race members to lock said power members against rotation under a torque stress on said element in excess of said predetermined value.

5. A torque transmitting and limiting mechanism, comprising a pair of coaxial, axially telescoped race members, one of which is rotatively fixed and the other of which has at least limited rotatability about the axis of said members, and means operatively connected to the last named member to so rotate the same only under torque applied thereto not exceeding a predetermined value, said last named means comprising a first power member having a rotatively fixed drive connection to said rotative race member, a second power member having means including a flexible torsion element drivingly connecting the same to said first power member, said first and second power members being rotatable as a unit up to a predetermined value of torque stressing of said torsion element, and means engaging between said race members to lock said power members against rotation under a torque stress on said element in excess of said predetermined value, comprising radially extending sprag elements rotatable with said rotatable race member and tiltable relative thereto, said sprag elements having wedging surfaces at a radial end thereof for wedging and locking engagement with said fixed race member, said wedging surfaces being circumferentially oriented oppositely relative to one another to take said wedging engagement upon tilting of the sprag elements in opposite directions, and control elements fixed on one of said power members and positioned adjacent said sprag elements to tilt the same for said wedging engagement with said fixed race member upon relative rotation of said power members under an excessive torque on said torsion element.

6. A bi-directional torque transmitting and limiting mechanism, comprising a pair of coaxial, axially telescoped race members, one of which is rotatively fixed and the other of which has at least limited rotatability about the axis of said members, and means operatively connected to the last named member to so rotate the same in either angular direction only under torque applied thereto not exceeding a predetermined value, said last named means comprising a first power member having a rotatively fixed drive connection to said rotative race member, a second power member having means including a flexible torsion element drivingly connecting the same to said first power member, said second power member being rotatable bi-directionally by said first power member as a unit up to a predetermined value of torque stressing of said torsion element and means engaging between said race members to lock said power members against rotation under a torque stress on said element in excess of said predetermined value, comprising at least one pair of radially extending sprag elements rotatable with said rotatable race member and tiltable relative thereto, said sprag elements having wedging surfaces at a radial end thereof for wedging and locking engagement with said fixed race member, said wedging surfaces being circumferentially oriented oppositely relative to one another to take said wedging engagement upon tilting of the sprag elements in opposite directions, and at least one pair of control elements fixed on said second power member and positioned adjacent said sprag elements to tilt the same for said wedging engagement with said fixed race member upon relative rotation of said power members under an excessive torque on said torsion element.

7. A bi-directional torque transmitting and limiting mechanism, comprising a pair of coaxial, axially telescoped race members, one of which is rotatively fixed and the other of which has at least limited rotatability about the axis of said members, and means operatively connected to the last named member to so rotate the same in either angular direction only under torque applied thereto not exceeding a predetermined value, said last named means comprising a first power member having a rotatively fixed drive connection to said rotative race member, a second power member having means including a flexible torsion element drivingly connecting the same to said first power member, said first and second power members being rotatable bi-directionally as a unit up to a predetermined value of torque stressing of said torsion element, and means engaging between said race members to lock said power members against rotation under a torque stress on said element in excess of said predetermined value, comprising at least one pair of radially extending sprag elements rotatable with said rotatable race member and tiltable relative thereto, said sprag elements having wedging surfaces at a radial end thereof for wedging and locking engagement with said fixed race member, said wedging surfaces being circumferentially oriented oppositely relative to one another to take said wedging engagement upon tilting of the sprag elements in opposite directions, means normally urging said sprag elements away from said wedging engagement, and at least one pair of control elements fixed on said second power member and positioned adjacent said sprag elements to tilt the same for said wedging engagement with said fixed race member upon relative rotation of power members under an excessive torque on said torsion element.

8. A torque transmitting and limiting mechanism, comprising a pair of coaxial, radially spaced and axially telescoped races, one of which is rotatively relatively fixed and the other of which has at least limited relative rotatability about the race axis, and means operatively connected to the last named race to so rotate the same only under torque applied thereto not exceeding a predetermined value, said last named means comprising a first member drivingly connected to said rotative race, a second member having means including a flexible torsion element drivingly connecting the same to said first member, said first and second members being rotatable as a unit up to a predetermined value of torque stressing of said torsion element, radially extending sprags wedgingly engageable between said races to lock said members against relative rotation under a torque stress on said element in excess of said predetermined value, and control elements fixed on one of said members and positioned adjacent said sprags to tilt the same for said wedging engagement with said relatively fixed race upon relative rotation of said first and second members under an excessive torque on said torsion element.

9. A torque transmitting and limiting mechanism, comprising a pair of coaxial, radially spaced and axially telescoped races, one of which is rotatively relatively fixed and the other of which has at least limited relative rotatability about the race axis, and means operatively connected to the last named race to so rotate the same only under torque applied thereto not exceeding a predetermined value, said last named means comprising a first member drivingly connected to said rotative race, a second member having means including a flexible torsion element drivingly connecting the same to said first member, said first and second members being rotatable as a unit up to a predetermined value of torque stressing of said torsion element, radially extending sprags wedgingly engageable between said races to lock said members against relative rotation under a torque stress on said element in excess of said predetermined value, said sprags being arranged in sets in which they are circumferentially oriented oppositely relative to one another to take said wedging engagement in opposite directions, and control elements fixed on one of said members and positioned adjacent said sprags to tilt correspondingly oriented sprags thereof for said wedging engagement with said relatively fixed race upon relative rotation of said first and second members under an excessive torque on said torsion element.

10. A torque transmitting and limiting mechanism, comprising a pair of coaxial, radially spaced and axially telescoped races, one of which is rotatively relatively fixed and the other of which has at least limited relative rotatability about the race axis, and means operatively connected to the last named race to so rotate the same only under torque applied thereto not exceeding a predetermined value, said last named means comprising a first member drivingly connected to said rotative race, a second member having means including a flexible torsion element drivingly connecting the same to said first member, said first and second members being rotatable as a unit up to a predetermined value of torque stressing of said torsion element, radially extending sprags wedgingly engageable between said races to lock said members against relative rotation under a torque stress on said element in excess of said predetermined value, said sprags being arranged in sets in which they are circumferentially oriented oppositely relative to one another to take said wedging engagement in opposite directions, control elements fixed on one of said members and positioned adjacent said sprags to tilt correspondingly oriented sprags thereof for said wedging engagement with said relatively fixed race upon relative rotation of said first and second members under an excessive torque on said torsion element, spring means urging all of said sprags out of engagement with said fixed race, and means positively engaging and urging other correspondingly oriented and disengaged sprags in opposition to said spring means.

11. A mechanism in accordance with claim 10, in which said last named means comprises auxiliary control elements positioned to engage and urge said other sprags in opposition to said spring means.

12. A mechanism in accordance with claim 10, in which said last named means comprises auxiliary control elements positioned to engage and urge said other sprags in opposition to said spring means, said auxiliary elements being fixedly mounted on the member to which said first named control elements are fixed.

13. A mechanism in accordance with claim 10, in which said last named means comprises auxiliary control elements positioned to engage and urge said other sprags in opposition to said spring means, said auxiliary elements being fixedly mounted on the member to which said first named control elements are fixed in alternation with the latter.

14. A mechanism in accordance with claim 10, in which said last named means comprises an annular control member mounted for circumferential floating movement between said races and provided with auxiliary control elements respectively engageable between oppositely oriented sprags of a set and between sprag sets to maintain engagement with the sprags of said sets in opposition to said spring means.

15. A mechanism in accordance with claim 10, in which said last named means comprises an annular control member mounted for circumferential floating movement between said races and provided with auxiliary control elements respectively engageable between oppositely oriented sprags of a set and between sprag sets to maintain engagement with the sprags of said sets in opposition to said spring means, said relatively rotatably race engaging and carrying said floating annular control member for said last named engagement.

16. A torque transmitting and limiting mechanism, comprising a pair of coaxial, axially telescoped race members, one of which is rotatively fixed and the other of which has at least limited rotatability about the axis of said members, a driver member having means operatively connecting the same to the last named race member to freely rotate the latter under torque applied thereto not exceeding a predetermined value, a driven member, said driver member having a drive connection to operate said driven member which is yieldable under a torque load on the latter in excess of said value, thereby occasioning a relative rotative movement of said driver and driven members, and parts operatively connected in socketed torque receiving engagement with said rotative race member, said parts being engaged by one of said driver and driven members in automatic response to said relative movement thereof under torque in excess of said value to engage said parts with said fixed race member to transmit the excess torque to the latter.

17. A bi-directional torque transmitting and limiting mechanism, comprising a pair of coaxial, axially telescoped race members, one of which is rotatively fixed and the other of which has at least limited rotatability about the axis of said members, a driver member having means operatively connecting the same to the last named race member to so rotate the latter in either angular direction only under torque applied thereto not exceeding a predetermined value, a driven member, said driver member having a drive connection to operate said driven member which is yieldable under a torque load on the latter in excess of said value, thereby occasioning a relative rotative movement of said driver and driven members, and parts operatively connected in torque receiving engagement with said rotative race member, said parts being engaged by one of said driver and driven members in automatic response to said relative movement thereof under torque in excess of said value to engage said parts with said fixed race member to transmit the excess torque to the latter.

18. A mechanism is accordance with claim 1, in which said last named means comprises sprags disposed between said race members, one of said power members having means engaging a sprag to place the same in race engaging and locking position upon relative rotation of said power members due to torsional stressing of said torsion element above said predetermined value, thus to so lock said power members.

19. A mechanism in accordance with claim 1 which is bi-directional in action, in which said last named means comprises sprags disposed in oppositely oriented position, in the circumferential sense, between said race members, one of said power members having means engaging a predeterminedly oriented sprag to place the same in race engaging and locking position upon relative rotation of said power members due to torsional stressing of said torsion element above said predetermined value, thus to so lock said power members, an oppositely oriented sprag being out of race locking position at this time.

20. A mechanism in accordance with claim 1 which is bi-directional in action, in which said last named means comprises sprags disposed in oppositely oriented position, in the circumferential sense, between said race members, one of said power members having means engaging a predeterminedly oriented sprag to place the same in race engaging and locking position upon relative rotation of said power members due to torsional stressing of said torsion element above said predetermined value, thus to so lock said power members, an oppositely oriented sprag being out of race locking position at this time, and means responsive to said relative rotation of the power members to engage and dampen vibration of said oppositely oriented sprag in said non-locking position of the latter.

21. A torque transmitting and limiting mechanism, comprising a pair of coaxial, axially telescoped race members, one of which is rotatively fixed and the other of which has at least limited rotatability about the axis of said members, a driver member having means operatively connecting the same to the last named race member to so rotate the latter only under torque applied thereto not exceeding a predetermined value, a driven member, said driver member having a drive connection to operate said driven member which is yieldable under a torque load on the latter in excess of said value, thereby occasioning a relative rotative movement of said driver and driven members, and sprags disposed for movement into torque transmitting engagement between said race members, said sprags being engaged by one of said driver and driven members in automatic response to said realtive movement thereof under torque in excess of said value to engage said last named sprags in wedging position between said race members to transmit the excess torque to the fixed race member.

22. A bi-directional torque transmitting and limiting mechanism, comprising a pair of coaxial, axially telescoped race members, one of which is rotatively fixed and the other of which has at least limited rotatability about the axis of said members, a driver member having means operatively connecting the same to the last named race member to so rotate the latter in either angular direction only under torque applied thereto not exceeding a predetermined value, a driven member, said driver member having a drive connection to operate said driven member which is yieldable under a torque load on the latter in excess of said value, thereby occasioning a relative rotative movement of said driver and driven members, and sprags disposed for movement into torque transmitting engagement between said race members, said sprags being disposed between said races in oppositely oriented sets in the circumferential sense, sprags of one set being positioned for said torque transmitting wedging engagement while sprags of the oppositely oriented set are not, the sprags of said one set being engaged by one of said driver and driven members in automatic response to said relative movement thereof under torque in excess of said value to place said last named sprags in wedging position between said race members to transmit the excess torque to the fixed race member.

23. A bi-directional torque transmitting and limiting mechanism, comprising a pair of coaxial, axially telescoped race members, one of which is rotatively fixed and the other of which has at least limited rotatability about the axis of said members, a driver member having means operatively connecting the same to the last named race member to so rotate the latter in either angular direction only under torque applied thereto not exceeding a predetermined value, a driven member, said driver member having a drive connection to operate said driven member which is yieldable under a torque load on the latter in excess of said value, thereby occasioning a relative rotative movement of said driver and driven members, and sprags disposed for movement into torque transmitting engagement between said race members, said sprags being disposed between said races in oppositely oriented sets in the circumferential sense, sprags of one set being positioned for said torque transmitting wedging engagement while sprags of the oppositely oriented set are not, the sprags of said one set being engaged by one of said driver and driven members in automatic response to said relative movement thereof under torque in excess of said value to place said last named sprags in wedging position between said race members to transmit the excess torque to the fixed race member, and means also controlled in response to said realtive movement of said driver and driven members to engage the sprags of said oppositely oriented set to dampen vibration thereof.

*24. A torque transmitting and limiting mechanism, comprising a pair of coaxial members, one of which is rotatively fixed and the other of which has at least limited rotatability about the axis of said members, a driver having means operatively connecting the same to the last named member to so rotate the latter as a driver member, and a driven member, said driver member having a drive connection to operate said driven member only under torque not exceeding a predetermined value, which connection is yieldable under a torque load in excess of said value, thereby occasioning a relative movement of said driver and driven members, said drive connection including a part operatively connected for torque transmitting engagement with the respective driver and driven members, said part being actuated by one of said driven and driven members in automatic response to said relative movement thereof, under torque in excess of said value, to engage said part with said rotatively fixed member to transmit the excess torque to the latter.*

*25. A bi-directional torque transmitting and limiting mechanism, comprising a pair of coaxial members, one of which is rotatively fixed and the other of which has at least limited rotatability about the axis of said members, a driver having means operatively connecting the same to the last named member to so rotate the latter as a driver member in either angular direction, and a driven member, said driver member having a drive connection to operate said driven member only under torque not exceeding a predetermined value, which connection is yieldable under a torque load in excess of said value, thereby occasioning a relative movement of said driver and driver members, said drive connection including parts operatively connected for torque transmitting engagement with the respective driver and driven members, said parts being actuated by one of said driver and driven members in automatic response to said relative movement thereof under torque in one angular direction or the other in excess of said value, to engage said parts with said rotatively fixed member to transmit the excess torque to the latter.*

*26. A torque transmitting and limiting mechanism comprising a pair of coaxial members, one of which is rotatively fixed and the other of which is a driver member having at least limited rotatability about the axis of said members, means to so rotate said driver member a driven member in axially telescoped relation to said rotatively fixed member, and means to rotate said driven member from said driver member only under torque not exceeding a predetermined value, comprising a drive connection to operate said driven member from said driver member under torque beneath said predetermined value, which connection is yieldable under a torque load in excess of said value, thereby occasioning a relative rotative movement of said driver and driver members, said drive connection including a part operatively connected for torque transmitting engagement with the respective driver and driven members, said part being actuated by one of said driver and driven members in automatic response to said relative movement thereof, under torque in excess of said value, to engage said part with said rotatively fixed member to transmit the excess torque to the latter.*

*27. A bi-directional torque transmitting and limiting mechanism, comprising a pair of coaxial members, one of which is rotatively fixed and the other of which is a driver member having at least limited rotatability about*

*axis of said members, means to so rotate said driver mber in either angular direction, a driven member axially telescoped relation to said rotatively fixed mem-, and means to rotate said driven member from said ver member only under torque not exceeding a pre-ermined value, comprising a drive connection to oper- said driven member from said driver member under que beneath said predetermined value, which con-tion is yieldable under a torque load in excess of said ue, thereby occasioning a relative rotative movement said driver and driven members, said drive connection luding parts operatively connected for torque trans-ting engagement with the respective driver and driven mbers, said parts being actuated by one of said driver l driven members in automatic response to said rela- movement thereof, under torque in one angular di-tion or the other in excess of said value, to engage said ts with said rotatively fixed member to transmit the ess torque to the latter.*

*28. A torque transmitting and limiting mechanism, nprising a pair of coaxial members, one of which is atively fixed and the other of which is a driver mem- having at least limited rotatability about the axis said members, means to so rotate said driver mem-, a driven member in axially telescoped relation to l rotatively fixed member, and means to rotate said ven member from said driver member only under que not exceeding a predetermined value, comprising lrive connection to operate said driven member from l driver member under torque beneath said prede-mined value, which connection is yieldable under a que load in excess of said value, thereby occasioning elative rotative movement of said driver and driven*

*members, said drive connection including a part actuated by one of said driver and driven members in automatic response to said relative movement thereof, under torque in excess of said value, to engage said part with said rotatively fixed member to transmit the excess torque to the latter.*

*29. A bi-directional torque transmitting and limiting mechanism, comprising a pair of coaxial members, one of which is rotatively fixed and the other of which is a driver member having at least limited rotatability about the axis of said members, means to so rotate said driver member in either angular direction, a driven member in axially telescoped relation to said rotatively fixed member, and means to rotate said driven member from said driver member only under torque not exceeding a predetermined value, comprising a drive connection to operate said driven member from said driver member under torque beneath said predetermined value, which connection is yieldable under a torque load in excess of said value, thereby occasioning a relative rotative movement of said driver and driven members, said drive connection including parts actuated by one of said driver and driven members in automatic response to said relative movement thereof, under torque in one angular direction or the other in excess of said value, to engage said parts with said rotatively fixed member to transmit the excess torque to the latter.*

References Cited in the file of this patent or the original patent

UNITED STATES PATENTS 2,881,873 Movick ---------- Apr. 14, 1959